(12) United States Patent
Williams et al.

(10) Patent No.: US 8,115,428 B2
(45) Date of Patent: Feb. 14, 2012

(54) ELECTRIC MOTOR CONTROL

(75) Inventors: Connel Brett Williams, Leamington Spa (GB); Christopher David Dixon, Coventry (GB)

(73) Assignee: TRW Limited, West Midlands (GB)

( * ) Notice: Subject to any disclaimer, the term of this patent is extended or adjusted under 35 U.S.C. 154(b) by 660 days.

(21) Appl. No.: 12/086,835

(22) PCT Filed: Dec. 21, 2006

(86) PCT No.: PCT/GB2006/004880
§ 371 (c)(1),
(2), (4) Date: Jan. 26, 2009

(87) PCT Pub. No.: WO2007/072033
PCT Pub. Date: Jun. 28, 2007

(65) Prior Publication Data
US 2009/0224707 A1   Sep. 10, 2009

(30) Foreign Application Priority Data

Dec. 23, 2005 (GB) .................................. 0526276.1

(51) Int. Cl.
*H02P 6/18* (2006.01)
(52) U.S. Cl. ......... 318/400.02; 318/400.21; 318/400.32; 318/400.34; 318/400.08
(58) Field of Classification Search ............. 318/400.02, 318/400.32, 400.21, 400.34, 400.08
See application file for complete search history.

(56) References Cited

U.S. PATENT DOCUMENTS

| 5,635,810 | A | 6/1997 | Goel |
| 5,703,449 | A | 12/1997 | Nagate et al. |
| 6,462,491 | B1 * | 10/2002 | Iijima et al. ............. 318/400.34 |
| 6,639,379 | B2 * | 10/2003 | Matsushita et al. ........... 318/727 |
| 6,927,548 | B2 * | 8/2005 | Nishizaki et al. ............. 318/432 |
| 7,348,756 | B2 * | 3/2008 | Ma et al. ..................... 318/803 |
| 7,385,365 | B2 * | 6/2008 | Feick ...................... 318/400.01 |
| 2002/0117990 | A1 | 8/2002 | Sawada et al. |
| 2004/0046519 | A1 | 3/2004 | Leonardi et al. |
| 2005/0151502 | A1 | 7/2005 | Quirion |

OTHER PUBLICATIONS

Parasiliti F. et al., "Sensorless speed control of a PM synchronous motor by sliding mode observer"; Industrial Electronics, 1997. ISIE '97., Proceedings of the IEEE International Symposium on Guimaraes, Portugal Jul. 7-11, 1997, New York, NY, USA, IEEE, US, Jul. 7, 1997, pp. 1106-1111, XP010264987 ISBN: 0-7803-3936-3.

Parasiliti F. et al., "Sensorless speed control of a PM synchronous motor based on sliding mode observer and extended Kalman filter"; Conference Record of the 2001 IEEE Industry Applications Conference. 36th IAS Annual Meeting. Chicago, Il. Sep. 30-Oct. 4, 2001, Conference Record of the IEEE Industry Applications Conference. IAS Annual Meeting, New York, NY.: IEEE, US, vol. 1 of 4. Conf. 36, Sep. 30, 2001, pp. 533-540, XP010561753 ISBN: 0-7803-7114-3.

(Continued)

*Primary Examiner* — Walter Benson
*Assistant Examiner* — David Luo
(74) *Attorney, Agent, or Firm* — MacMillan, Sobanski & Todd, LLC

(57) ABSTRACT

A control system for an electric motor is arranged to determine the position of the motor from at least one electrical parameter by means of a position determining algorithm. It is further arranged to monitor at least one algorithm parameter defined by the algorithm and if the monitored parameter meets a predetermined fault condition to generate a fault indication.

25 Claims, 10 Drawing Sheets

OTHER PUBLICATIONS

Hossain S. et al., "Four quadrant and zero speed sensorless control of a switched reluctance motor"; Conference Record of the 2002 IEEE Industry Applications Conference. 37th IAS Annual Meeting. Pittsburgh, PA., Oct. 13-18, 2002, Conference Record of the IEEE Industry Applications Conference. IAS Annual Meeting New York, NY: IEEE, US, vol. 1 of 4, Conf. 37, Oct. 13, 2002, pp. 1641-1646, XP010610099 ISBN: 0-7803-7420-7.

International Search Report to International Application No. PCT/GB2006/004880 dated May 29, 2007.

GB Search Report dated Mar. 1, 2006 for Application No. GB0526276.1 (Priority Application).

* cited by examiner

ELECTRIC MOTOR CONTROL

CROSS-REFERENCE TO RELATED APPLICATIONS

This application is the National Stage of International Application No. PCT/GB2006/004880 filed Dec. 21, 2006, the disclosures of which are incorporated herein by reference in their entirety, and which claimed priority to Great Britain Patent Application No. 0526276.1 filed Dec. 23, 2005, the disclosures of which are incorporated herein by reference in their entirety.

BACKGROUND OF THE INVENTION

This invention relates to electric motors, and in particular to the position sensorless control of electric motors.

With the adoption of sensorless position algorithms for determining motor position, the diagnostics normally used for systems with position sensors cannot generally be used.

BRIEF SUMMARY OF THE INVENTION

Accordingly the present invention provides a control system for an electric motor, the control system being arranged to determine the position of the motor from at least one electrical parameter by means of a position determining algorithm, and further arranged to monitor at least one algorithm parameter defined by the algorithm and if the monitored parameter meets a predetermined fault condition to generate a fault indication.

Other advantages of this invention will become apparent to those skilled in the art from the following detailed description of the preferred embodiments, when read in light of the accompanying drawings.

DETAILED DESCRIPTION OF THE INVENTION

Figure 1:
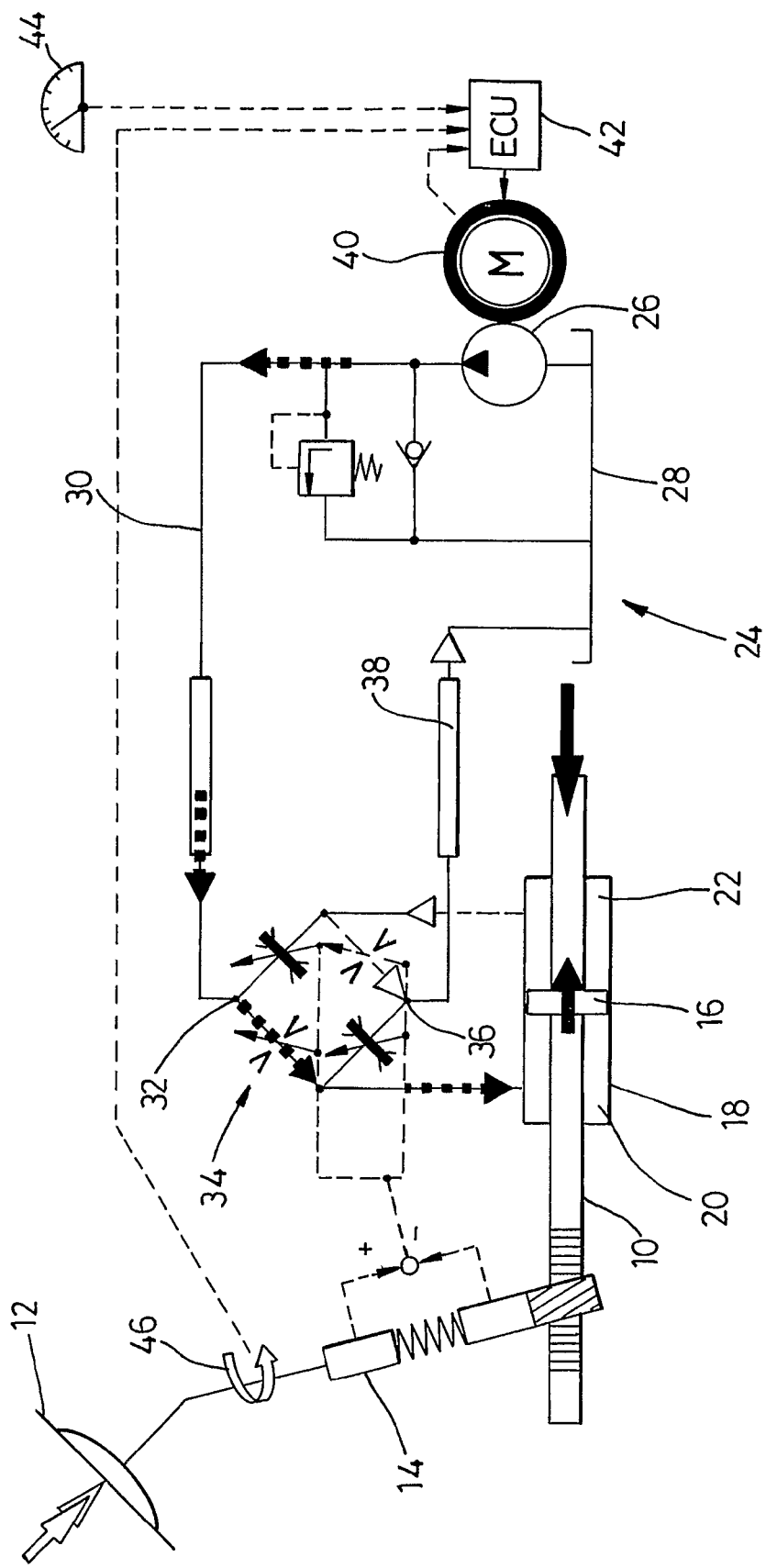
FIG. 1 shows a power steering system according to an embodiment of the invention.

Referring to FIG. 1, an electro-hydraulic power steering system comprises a steering rack 10 arranged to be moved to the left and right to control the steering angle of the front wheels of a vehicle in conventional manner. The rack is moved primarily by driver input to the steering wheel 12 which is connected to the steering rack 10 by a steering column 14. Power assistance is provided by means of a two-sided piston 16 mounted on the steering rack 10 and movable in a cylinder 18. The piston divides the cylinder into two chambers 20, 22. The pressure of hydraulic fluid in the two hydraulic chambers 20, 22 is controlled by a hydraulic circuit 24 to control the direction and magnitude of the power assistance force applied to the steering rack 10.

The hydraulic circuit comprises a pump 26 arranged to pump hydraulic fluid under pressure from a reservoir 28 to a feed line 30. The feed line is connected to an inlet port 32 of a pressure control valve 34, which is represented functionally in FIG. 1. An outlet port 36 of the pressure control valve 34 is connected via a return line 38 to the reservoir 28. The pressure control valve 34 is arranged to connect either the left or right hydraulic chamber 20, 22 to the feed line 30 and the other chamber 20, 22 to the return line depending on which direction steering torque is applied to the steering wheel 12. It is also arranged to control the fluid pressure applied to the hydraulic chambers 20, 22 to control the level of hydraulic power assistance depending on the steering torque being transmitted from the steering wheel 12 to the rack 10 through the steering column 14. The pressure in the hydraulic chambers 20, 22 is clearly determined by the speed of the pump 26 as well as the state of the pressure control valve 34.

The pump 26 is driven by a motor 40 which is controlled by a control unit 42. The control unit 42 receives an input signal from a vehicle speed sensor 44 which is variable with vehicle speed, and an input signal from a steering rate sensor 46 which varies with the steering rate, i.e. the rate of rotation of the steering wheel 12. The control unit 42 controls the speed of the pump 26 on the basis of these inputs. This system is therefore referred to as a speed control system.

Figure 2:
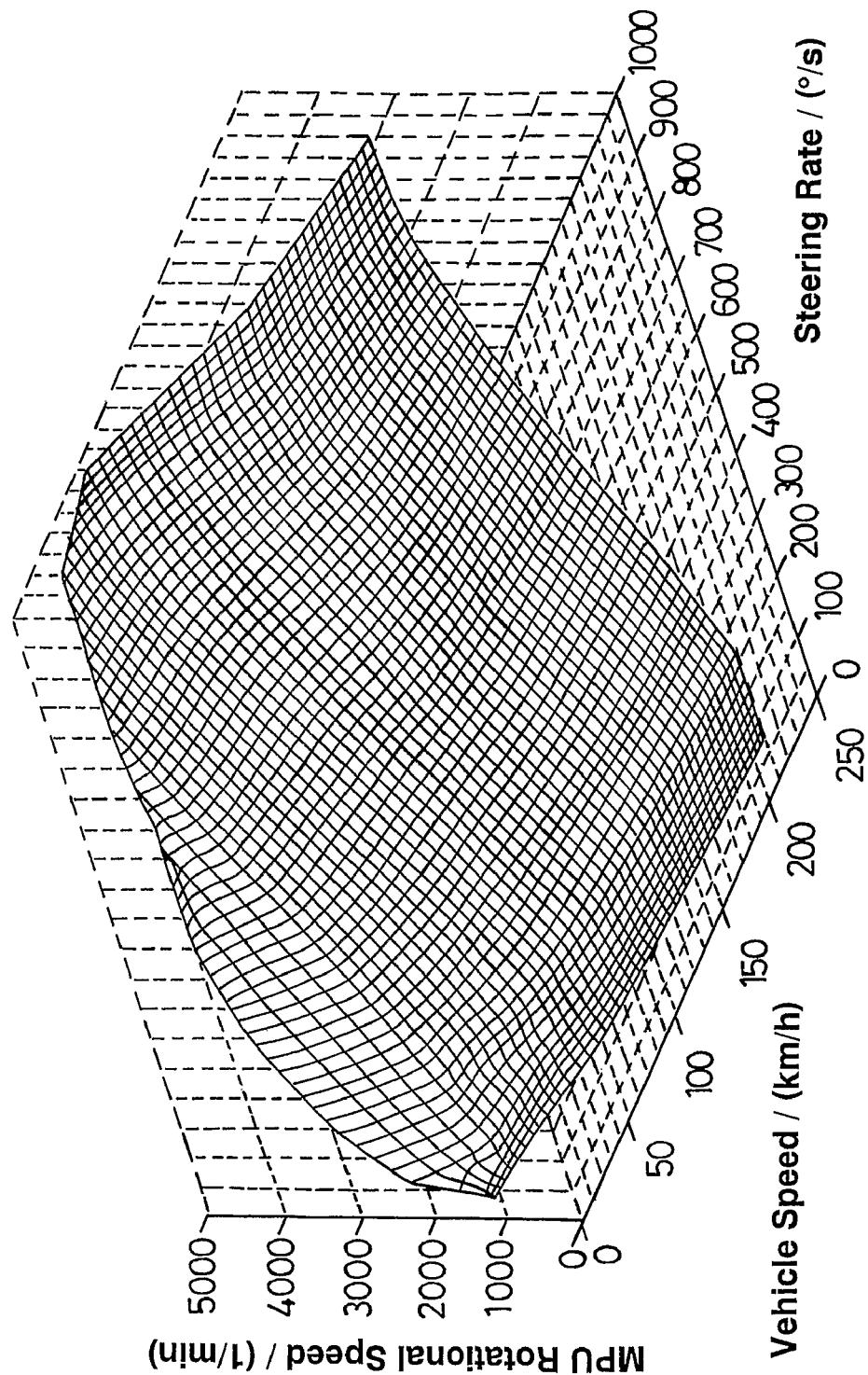
FIG. 2 is a graph of the speed control function of an electric motor of the system of FIG. 1.

Referring to FIG. 2, the speed of the motor 40, and hence the pump 26, is generally arranged to increase with steering rate, and decrease with increasing vehicle speed.

Figure 3:
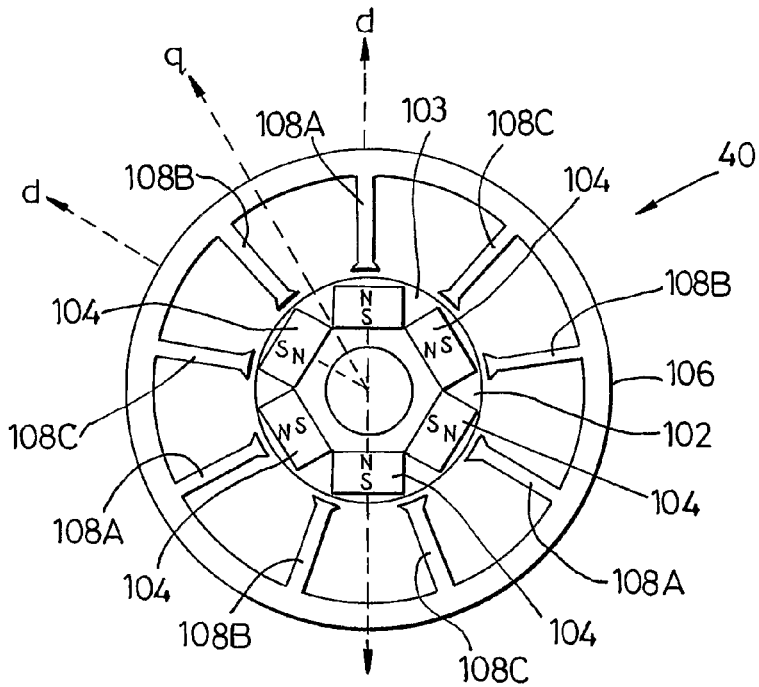
FIG. 3 is a diagram of an electric motor of the system of FIG. 1.

Referring to FIG. 3, the motor 40 is a three phase electrically commutated sinusoidal AC brushless permanent magnet synchronous motor which comprises a rotor 102 having, for example, six magnets 104 mounted on it, which in this instance are arranged so as to provide six poles which alternate between north and south around the rotor. The rotor 102 therefore defines three direct or d axes evenly spaced around the rotor and three quadrature or q axes interspaced between the d axes. The d axes are aligned with the magnetic poles of the magnets 104 where the lines of magnetic flux from the rotor are in the radial direction, and the q axes are spaced between the d axes where the lines of magnetic flux from the rotor are in the tangential direction. As the rotor rotates, the directions of the d and q axes clearly rotate with it.

A stator 106 in this particular embodiment comprises, for example, a nine slot copper wound element having three groups 108A, 108B, 108C of three teeth, each group of teeth having a common winding forming a respective phase. There are therefore three electrical cycles in each full rotation of the rotor, and the three teeth in any phase 108A, 108B, 108C are always in the same electrical position as each other.

Figure 4:
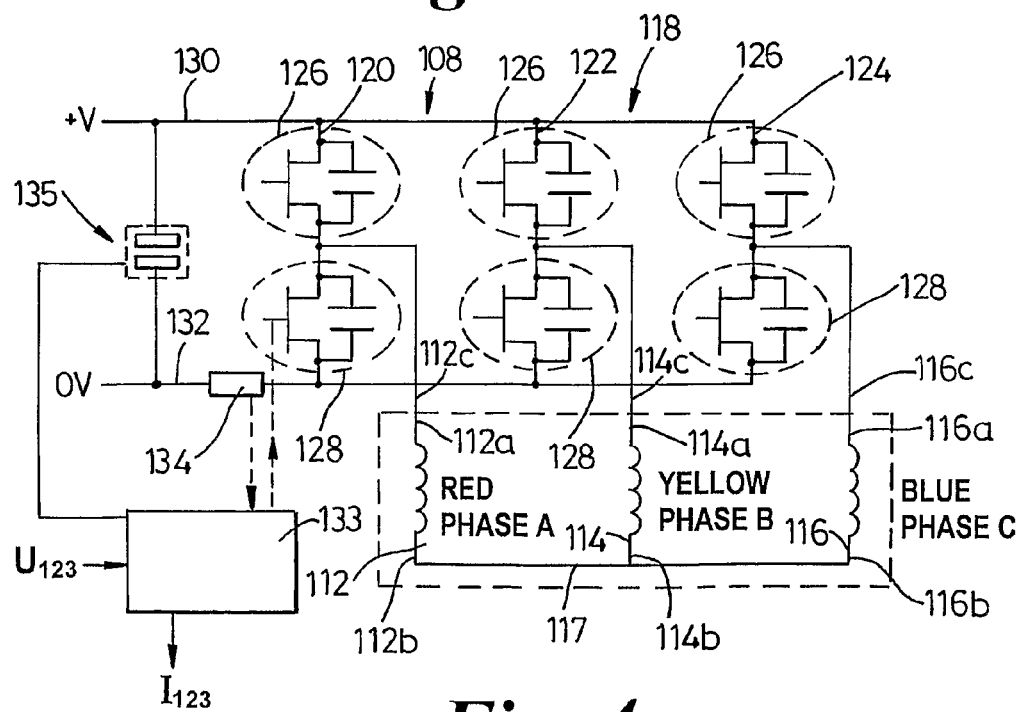
FIG. 4 is diagram of a drive circuit for the motor of FIG. 3.

Referring to FIG. 4, the three motor windings 112, 114, 116, generally designated as phases A, B and C, are connected in a star network. In other embodiments, other arrangements, such as delta networks, can be used. The phase windings are coiled around the stator teeth 108A, 108B, 108C respectively. One end 112a, 114a, 116a of each coil is connected to a respective terminal 112c, 114c, 116c. The other ends 112b, 114b, 116b, of the coils are connected together to form the star centre 117. A drive circuit comprises a three-phase bridge 118. Each arm 120, 122, 124 of the bridge comprises a pair of switches in the form of a top transistor 126 and a bottom transistor 128 connected in series between a supply rail 130 and ground line 132. A DC link voltage is applied between the supply rail 130 and the ground line 132. The motor windings 112, 114, 116 are each tapped off from between a respective complementary pair of transistors 126, 128. The transistors 126, 128 are turned on and off in a controlled manner by a drive stage controller 133 within the control unit 42 to provide pulse width modulation (PWM) of the potential applied to each of the terminals 112c, 114c, 116c, thereby to control the potential difference applied across each of the windings 112, 114, 116 and hence also the current flowing through the windings. This in turn controls the strength and orientation of the magnetic field produced by the windings, and hence the torque and speed of the motor.

A current measuring device in the form of a resistor 134 is provided in the ground line 132 between the motor 40 and ground so that the controller 42 can measure the total current flowing though all of the windings 112, 114, 116. In order to measure the current in each of the windings the total current has to be sampled at precise instants within the PWM period where the voltage applied to each terminal of the winding (and hence the conduction state of a particular phase) is known. As is well known, in order for the currents in each of the windings to be measured in any one PWM period, the drive circuit needs to be in each of at least two different active states for a predetermined minimum time. The drive stage controller 133 can determine the phase currents from the voltages across the resistor 134 measured at different times in the PWM period.

A DC link voltage sensor 135 is arranged to measure the DC link voltage across the drive circuit, i.e. between the supply rail 130 and the ground line 132. The drive stage controller 133 receives an input from this voltage sensor 135. From this input the controller is arranged to measure the phase voltages in the motor. In order to do this, the controller 133 determines the modulation duty cycle of each motor phase, i.e. the proportion of each PWM period for which the phase is connected to the supply rail, and multiplies this by the measured DC link voltage. This gives a measure of the phase voltage for each phase.

The control unit 42 is arranged to determine the phase voltages of the motor that will produce the required motor currents and to input these voltages to the drive stage controller 133. The drive stage controller 133 is arranged to control the transistors of the drive stage to produce the required phase voltages as will now be described.

Figure 5:
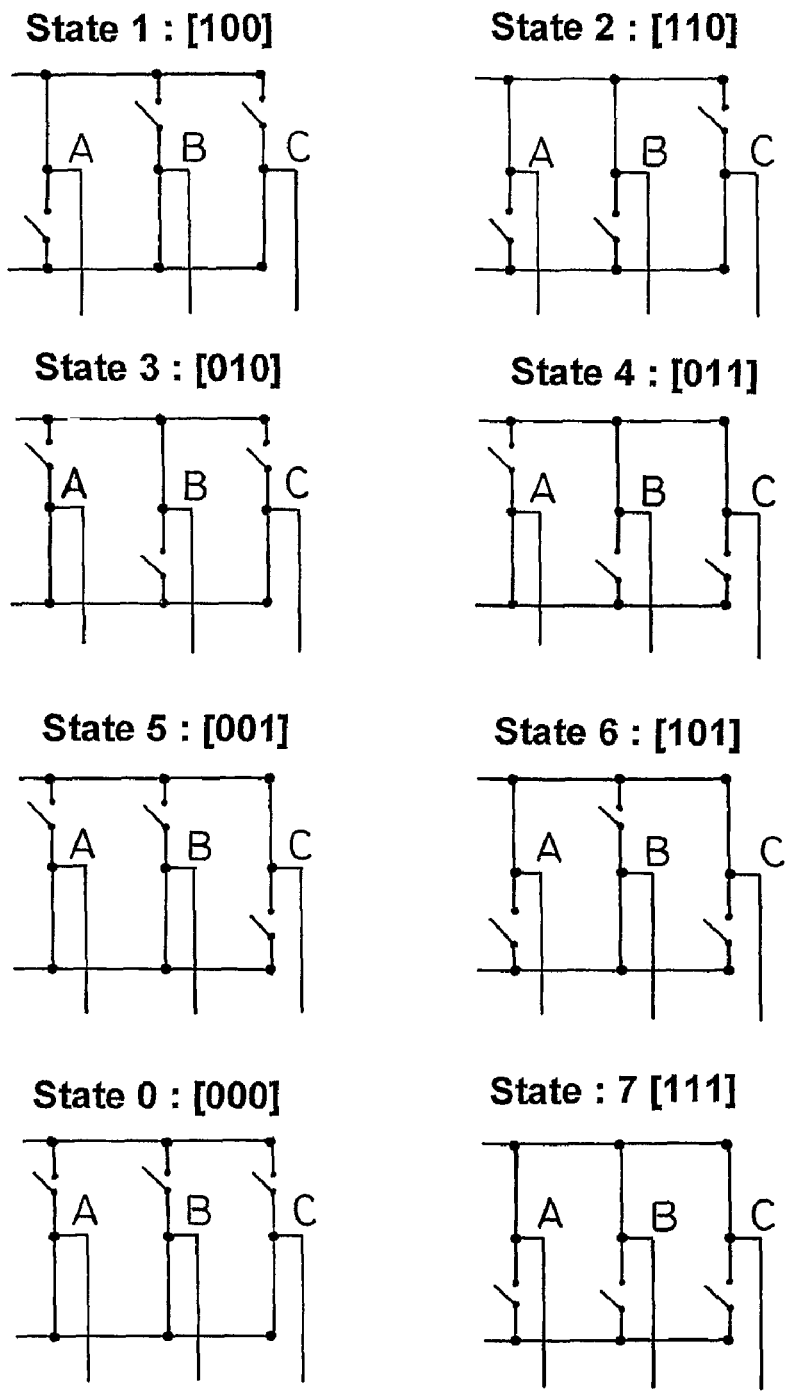
FIG. 5 is a diagram showing the different electrical states of the drive circuit of FIG. 3

Referring to FIG. 5, each winding 102, 104, 106 in a three-phase system can only be connected to either the supply rail 120 or the ground line 122 and there are therefore eight possible states of the control circuit. Using 1 to represent one of the phases being at positive voltage and 0 to represent a phase connected to ground, state 1 can be represented as [100] indicating phase A at 1, phase B at 0 and phase C at 0, State 2 is represented as [110], state 3 as [010], state 4 as [011], state 5 as [001], state 6 as [101], state 0 as [000] and state 7 as [111]. Each of states 1 to 6 is a conducting state in which current flows through all of the windings 102, 104, 106, flowing in one direction through one of them and in the other direction through the other two. State 0 is a zero volt state in which all of the windings are connected to ground and state 7 is a zero volt state in which all the windings are connected to the supply rail.

States 1, 2, 3, 4, 5 and 6 are herein also referred to as states +A, −C, +B, −A, +C and −B respectively, because they each represent the states in which the voltage applied across the windings is in a positive or negative direction for a respective one of the phases. For example in the +A state the A phase is connected to the supply rail and the other two phases are connected to the ground link, and in the −A state the connections are reversed.

When the circuit is being controlled to produce PWM, each of the phases will normally be turned on and off once in each PWM period. The relative lengths of time that are taken up in each state will determine the magnitude and direction of the magnetic field produced in each winding, and hence the magnitude and direction of the total torque applied to the rotor. These lengths of time, or duty ratios, can be calculated using various modulation algorithms but in this embodiment a space vector modulation technique is used.

Figure 6:
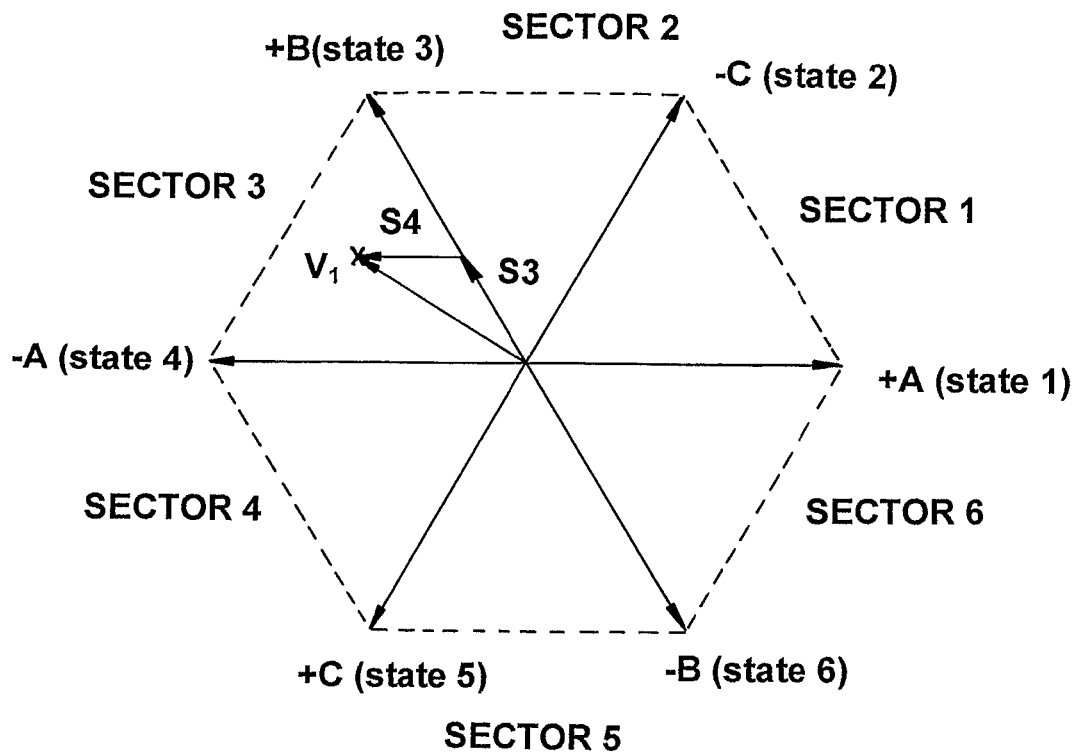
FIG. 6 is a space vector diagram used to determine the states of the drive circuit which are required to produce a desired motor output.

Referring to FIG. 6, in space vector modulation systems, the times in each PWM period spent in each of the states are represented as state vectors in a space vector modulation (SVM) diagram. In this type of diagram, single state vectors are those in the directions of the vectors S1 to S6, and the length of the vectors in each of these directions represents the amount of time in each PWM period spent in the respective state. This means that any desired voltage in the windings can be represented as a point on the diagram which corresponds to a voltage vector which represents the magnitude and direction of the voltage, and can be produced by a combination of state vectors S1, S2, etc. the lengths of which represent the time in each PWM period spent in that state. For example, the desired voltage vector $V_1$ can be represented as the sum of vectors S3 and S4. As the motor rotates, the direction of the desired vector will change, so the vector will rotate about the centre of the diagram, the length of the vector also changing as the required torque from the motor changes.

Figure 7:
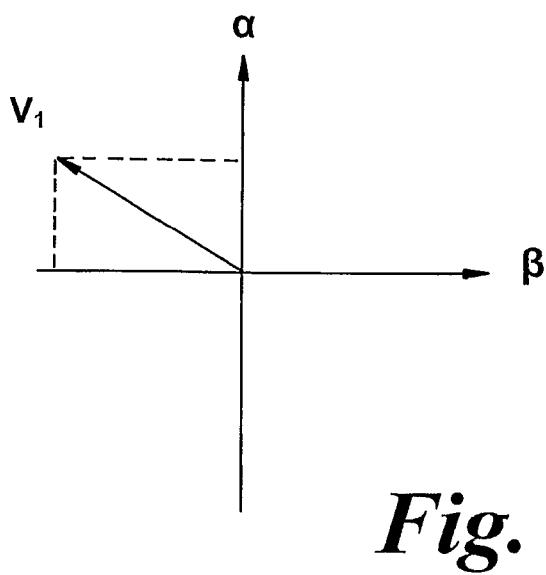
FIG. 7 shows the components of motor phase voltages in the motor of FIG. 3.

Referring to FIG. 7, the desired voltage from the stator windings can also be expressed in terms of two components, one in each of two orthogonal directions $\alpha$, $\beta$. It will be appreciated from FIG. 3 that the motor goes through three electrical cycles for each complete rotation of the rotor 102. In each electrical cycle the demanded voltage vector will rotate around the state vector diagram once. The directions of the $\alpha$ and $\beta$ components are therefore spaced apart by the same angle as the d and q axes, with the $\alpha$ and $\beta$ components defining the voltage vector relative to the stator and the d and q components defining the voltage vector relative to the rotor. Provided the rotor position is know, the voltage as defined in any one of the d/q, $\alpha/\beta$ or A/B/C components can be converted to any of the others.

Figure 8:
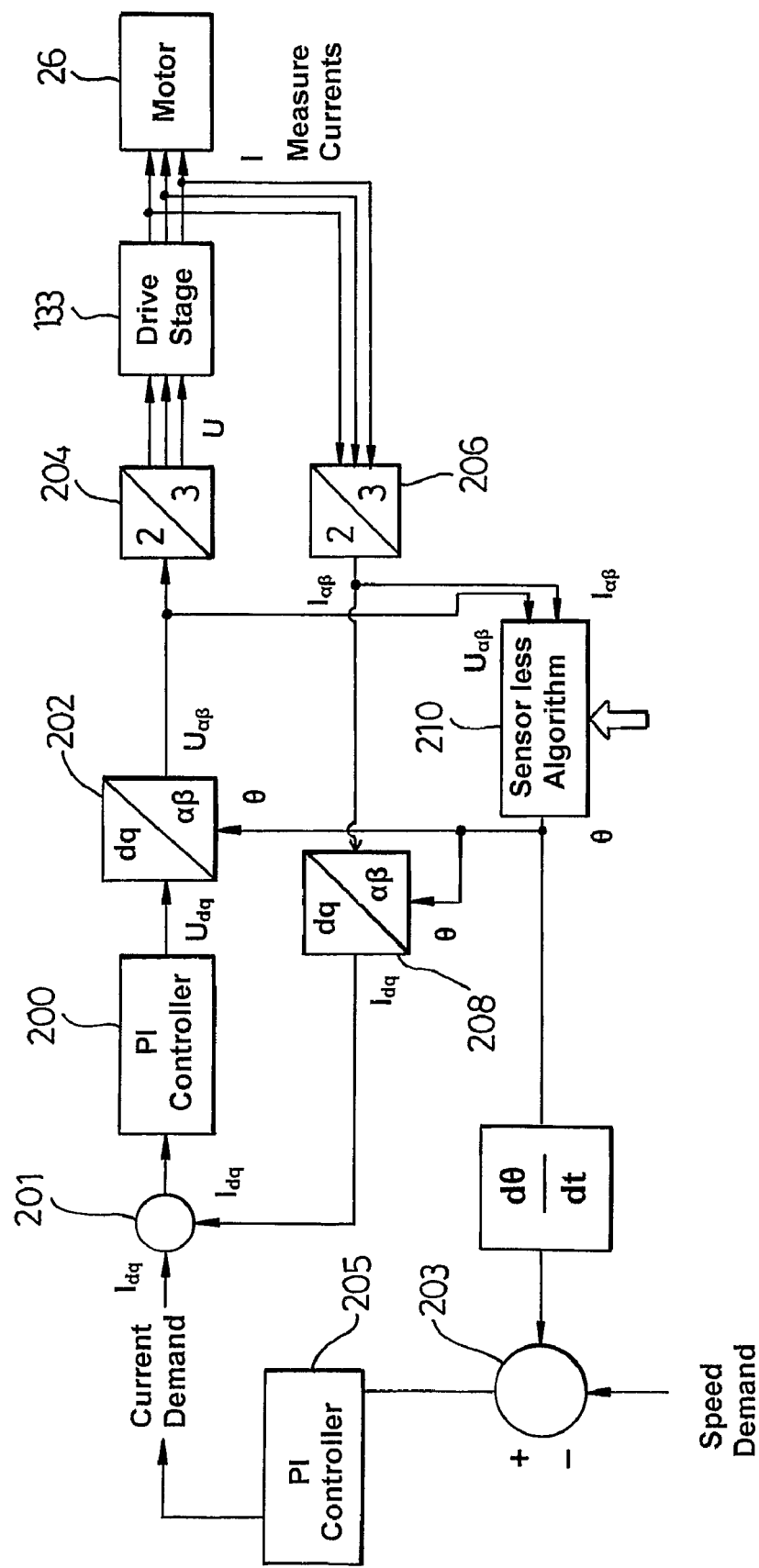
FIG. 8 is a functional block diagram of the motor and control unit of FIG. 1.

Referring to FIG. 8, the operation of the control unit 42 will now be described in more detail. The required rotational speed of the motor, as derived from the plot of FIG. 2, compared to the measured rotational speed by means of a comparator 203. The difference between the two is input to a PI controller 205 which calculates the motor current required to reduce this difference, and outputs a corresponding current demand $I_{dq}$ The demanded current components $I_{dq}$ are compared with corresponding measured d and q axis currents, and the difference measured by a comparator 201. Two PI (proportional/integral) controllers 200 (only one of which is shown) are arranged to use the difference between the measured and demanded d and q axis currents to determine the required d and q axis voltages $U_{dq}$. A dq/$\alpha\beta$ converter 202 converts the d and q axis voltages to $\alpha$ and $\beta$ axis voltages $U_{\alpha\beta}$, using motor position as an input. The motor position is determined using a sensorless algorithm as described below. A further converter 204 converts the $\alpha$ and $\beta$ axis voltages to desired phase voltages $U_{abc}$ for the three motor phases. These phase voltages are input to the drive stage controller 133 which controls the drive stage 118 as described above to achieve the desired phase voltages.

The three measured phase currents $I_{abc}$, in this case as measured using the single current sensor 134, are input to a first current converter 206 which converts them to α and β axis currents $I_{\alpha\beta}$. These are then input to a second current converter 208, together with the motor position, and the second current converter 208 converts them to d and q axis currents $I_{dq}$. These measured d and q axis currents are used for comparison with the demanded d and q axis currents as described above.

Figure 9:
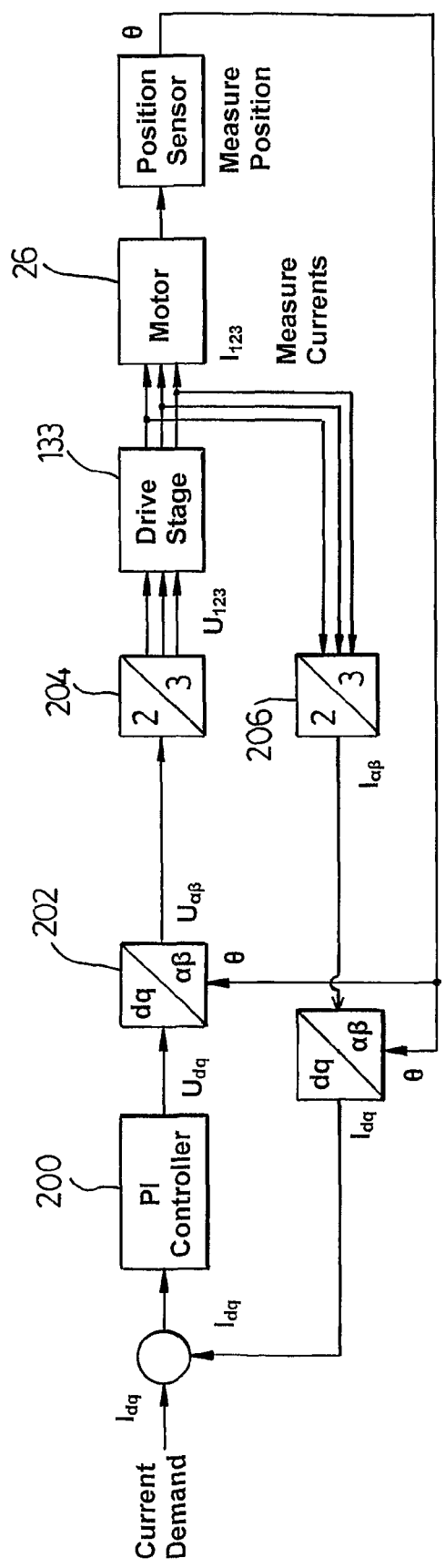
FIG. 9 is a functional block diagram of a motor and control unit of a known system using a motor position sensor.

For reference, a system in which a motor position sensor is used instead of the position determining algorithm is shown in FIG. 9.

Figure 10:
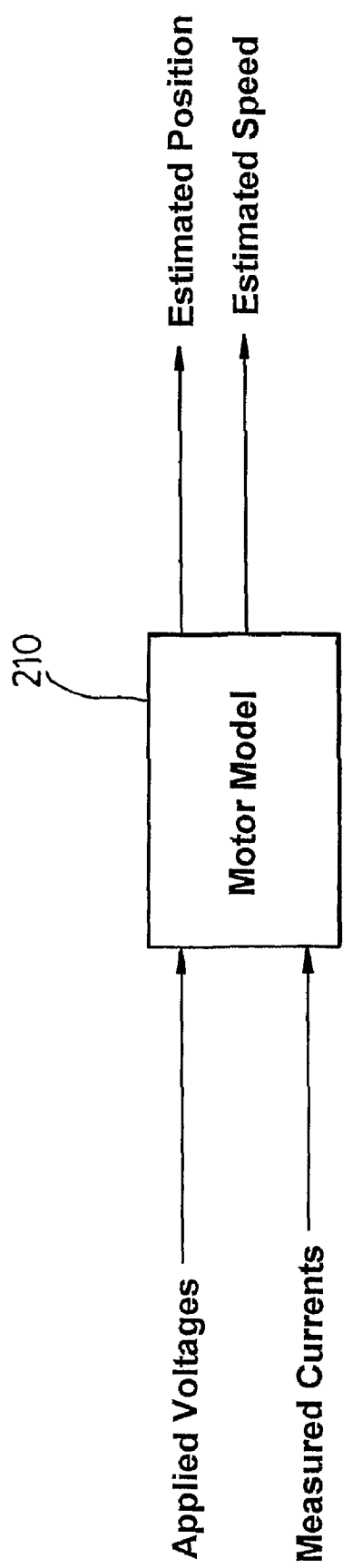
FIG. 10 shows the inputs and outputs of the sensorless algorithm of FIG. 8.

Referring to FIG. 10, a sensorless motor position determining algorithm 210 is arranged to receive as inputs the applied voltages, in this case in the form of α and β axis voltages, and the measured currents, in this case in the form of the α and β axis currents. The sensorless algorithm comprises a model of the motor, and produces from the inputs estimates of motor position and motor speed.

Figure 11:
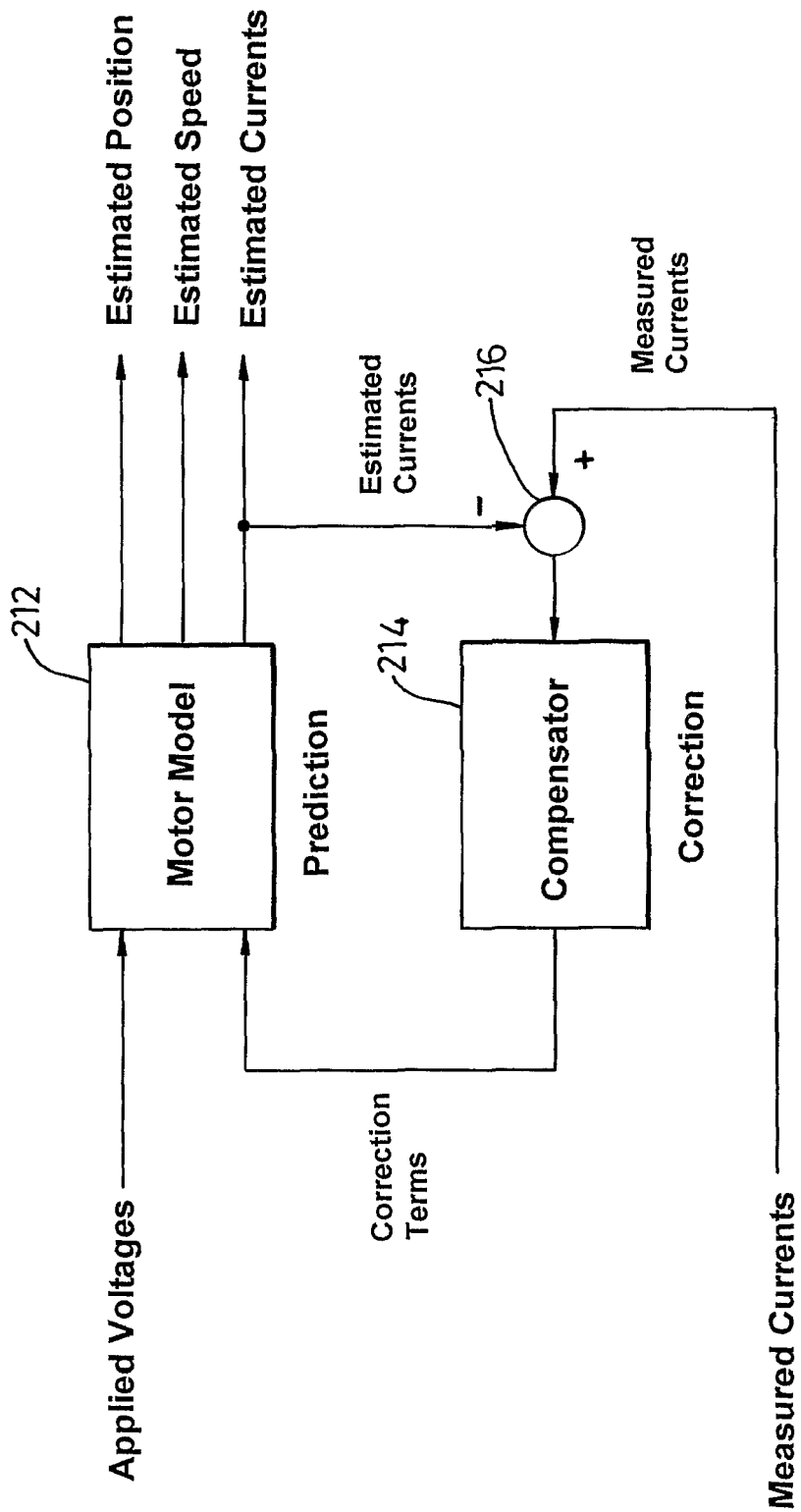
FIG. 11 shows the inputs and outputs of separate parts of the sensorless algorithm of FIG. 10.

Referring to FIG. 11, the algorithm in this case is a predictor-corrector or observer type algorithm. It includes a predictor 212 and a compensator or observer 214. The predictor 212 includes a model of the motor, and optionally other parts of the system, which includes definitions of its motor electrical parameters, such as resistance and inductance, and also the physical parameters such as inertia and damping. The model is defined as a series of equations, which derive model outputs from model inputs. The model is arranged to receive as inputs the applied voltages. It produces as outputs estimates for various parameters or states of the motor, specifically motor position and motor speed and the currents in the motor. The estimated currents are compared with the measured currents in a comparator 216 and the difference between the two is input as an error or residual signal to the compensator 214. The compensator 214 derives, from the residual, a correction factor for each of the motor states which is arranged to minimize the current residual, and hence to reduce the error in the position estimation. The correction terms output by the compensator 214 are input to the predictor 212 which corrects the states accordingly. The compensator 214 therefore provides a closed loop feedback for the predictor that enables the states, for example the position and speed, defined by model, to be corrected. This makes the sensorless algorithm robust to measurement and model errors.

The following equation represents in general terms the operation of the observer, which in this case is a non-linear observer to accommodate the non-linear terms in the model of the motor. The state estimates (motor phase currents, rotor position and rotor speed) are represented by $\hat{x}$, and the measured phase voltages by u. The motor and system dynamics are represented by the non-linear functions A and B. The actual states are represented by x, so the residuals are represented by $(x-\hat{x})$, and the corrector by the non-linear function C.

$$\dot{\hat{x}} = A\hat{x} + Bu + C(x - \hat{x})$$

The equations for the non-linear observer in this example are:

$$\frac{d\hat{i}_\alpha}{dt} = -\frac{R}{L}\hat{i}_\alpha + \frac{k_e \hat{\omega}_m}{\sqrt{3}L}\sin(\hat{\theta}_e) + \frac{1}{L}u_\alpha + corr_\alpha \quad (1)$$

$$\frac{d\hat{i}_\beta}{dt} = -\frac{R}{L}\hat{i}_\beta - \frac{k_e \hat{\omega}_m}{\sqrt{3}L}\cos(\hat{\theta}_e) + \frac{1}{L}u_\beta + corr_\beta \quad (2)$$

$$\frac{d\hat{\omega}_m}{dt} = \frac{k_t}{J}\hat{i}_q - \frac{B}{J}\hat{\omega}_m + corr_\omega \quad (3)$$

$$\frac{d\hat{\theta}_e}{dt} = p\hat{\omega}_m + corr_\theta \quad (4)$$

The following correction terms are used in the observer:

$$corr_\alpha = g_i(i_\alpha - \hat{i}_\alpha) \quad (5)$$

$$corr_\beta = g_i(i_\beta - \hat{i}_\beta) \quad (6)$$

$$corr_\omega = -g_\omega \frac{\sqrt{3}L}{k_e}(i_q - \hat{i}_q) \quad (7)$$

$$corr_\theta = g_\theta \frac{\sqrt{3}L}{k_e}\frac{1}{\hat{\omega}_m}(i_d - \hat{i}_d) \quad (8)$$

where:

$$\hat{i}_d = \hat{i}_\alpha \cos(\hat{\theta}_e) + \hat{i}_\beta \sin(\hat{\theta}_e) \quad (9)$$

$$\hat{i}_q = -\hat{i}_\alpha \sin(\hat{\theta}_e) + \hat{i}_\beta \cos(\hat{\theta}_e) \quad (10)$$

The terms in these equations are defined as follows:
(α,β)=stator (fixed) reference frame
(d,q)=rotor reference frame
$i_\alpha$, $i_\beta$=motor currents
$u_\alpha$, $u_\beta$=motor voltages
$\theta_e$=motor electrical angle (radians electrical)
$\omega_m$=motor mechanical angular velocity (radians mechanical per second)
R=motor phase resistance
L=motor inductance (phase self-inductance plus mutual inductance)
B=motor mechanical viscosity
J=motor mechanical inertia
$k_e$=motor back emf constant (as defined below)
$k_t$=motor torque constant (as defined below)
p=number of pole pairs for the motor
$g_i$, $g_w$, $g_\theta$=observer gains (tuneable parameters)

The motor back-emf and torque constants are defined as follows:
$k_e$=peak line-to-line voltage/mechanical angular velocity
$k_t$=average motor torque/peak motor current The symbol ^ above a quantity indicates that it is an estimated value as opposed to a measured value.

The values for each of the variables are obtained as follows:
$i_\alpha$, $i_\beta$ are derived from the measured phase currents as described above;
$u_\alpha$, $u_\beta$ are derived from the measured phase voltages;
$\theta_e$ is the variable being determined from the algorithm;
$\hat{\omega}_m$ is an internal state of the observer. Externally of the observer, the angular velocity is determined by differentiating the motor position state $\theta_e$ of the observer;
R, L, B, and J are defined as constants;
$k_e$ and $k_t$ are defined as indicated above and determined using off-line measurements;

p is the number of motor pole pairs, which is a known constant.

The fact that the controller is arranged to derive the motor speed from the differential of the estimated position has the advantage that, providing the rotor is turning and the system has reached a steady state equilibrium, the accuracy of the speed signal for the speed control of the motor is determined only by the accuracy of the clock of the microprocessor in the controller that is running the algorithm.

The sensorless position determining algorithm described above determines rotor position by monitoring an electrical parameter of the motor that varies with rotational position. Specifically it estimates the phase angle of the rotor back-emf, which in turn is the derivative of rotor flux and varies with the rotational position of the motor.

The advantage of using a predictor/compensator type of sensorless algorithm is that it compensates for a number of variable parameters that could otherwise affect the accuracy of the position estimation. Some of the parameters used in the algorithm equations will vary from one motor to another. These include, for example, motor phase resistance R, motor inductance L, motor mechanical viscosity B, motor mechanical inertia J, and the motor back emf and torque constants $K_e$ and $k_t$. If a predictor/compensator system were not used, then these parameters could be measured for each motor as it is produced and input individually into the sensorless algorithm. However, this is obviously time consuming and inconvenient. Some of the parameters will also vary with temperature, such as R, L and B. Again, if the predictor/compensator model were not used, then the temperature could be monitored and the equations of the algorithm modified to take the temperature into account. However, this makes the model significantly more complicated, which increases the computational overheads.

For reference, a system in which a motor position sensor is used instead of the position determining algorithm is shown in FIG. 9.

There are a number of faults that can occur with the position determining algorithm described above. One such fault is incorrect convergence. The algorithm, as with many others, has two solutions, one of which is correct and one of which is 180° out. If the incorrect solution is reached then the motor will be driven to rotate in the opposite direction to that which is desired. In some cases if the algorithm is poorly tuned, it can converge on a position which is offset by a fixed amount from the true position, the fixed amount being less than 180°. Another possible fault can result from changes in system parameters such as a DC offset which results in an offset between the true motor position and that determined by the algorithm. Another possible fault is that the rotor becomes locked so that it cannot move. This can result in the algorithm producing a position output that ramps at approximately the desired speed. A further possible fault is that the algorithm can go unstable resulting in incorrect position estimation. The instability can be either bounded, in which case the position estimation oscillates around a particular position, or unbounded, in which case the position estimation tends to infinity.

The controller is therefore arranged to carry out a number of diagnostic checks on the position determining algorithm to check, as far as possible, that it is operating correctly.

One diagnostic check is carried out using the current residuals. As described above these are the difference between the motor currents as determined by the sensorless algorithm and the corresponding measured currents. In this case the d and q axis current residuals are used, but the α/β or A/B/C components can equally be used. The residuals are monitored to determine whether either of the d or q axis residuals exceeds a predetermined limit. If one of the residuals does exceed the limit, then a fault is identified and a fault-indicating signal generated.

In a modification to this embodiment, the residuals are both monitored over time, and a fault identified only if one of them exceeds the relevant limit for more than a predetermined time. In a further modification the sum of the magnitudes of the d and q axis residuals is determined, and a fault identified only if the sum exceeds a predetermined limit, either once, or for a predetermined time.

As indicated above, the α and β coordinate residuals may be used instead of the d and q axis residuals. However in this case it may be necessary to rectify the current signals to achieve an effective check.

A further diagnostic check whether the algorithm is converging on the wrong solution that produces a position signal that does not correspond with the true position of the motor. As described above in this embodiment it is possible for the algorithm to converge on a solution that is 180° out from the correct position. In order to monitor for this, the controller 42 is arranged to compare motor angular velocity state $\hat{\omega}$ with the differential with respect to time of the angular position state θ, to determine whether or not they have the same sign. If these two estimates of the angular velocity have different signs then this indicates that the algorithm has converged on the incorrect solution, and a fault indication is generated. Again the controller can be arranged to generate the fault indication if the velocity state $\hat{\omega}$ and the differential of the position state θ are detected as being of different sign, or it may be arranged to generate a fault indication only of the difference in sign is maintained for a predetermined period.

When the motor is starting up from rest, it is possible for the two estimates of angular velocity to have different signs because the motor is turning in the wrong direction, rather than because the position determining algorithm is faulty. Therefore this diagnostic test is disabled for a predetermined time after the motor controller is enabled, i.e. after the controller begins to start the motor.

A further diagnostic check that is used is to monitor the difference between the two measures of the motor velocity, i.e. the velocity state $\hat{\omega}$ and the differential of the position state θ. If these two measures differ by a predetermined amount, then a fault indication is generated. This can be determined by monitoring the error or residual between the two measures and determining whether it moves outside a predetermined bounded area. As with previous tests, this one can be modified so that the fault indication is only generated if the two measures differ by more than a predetermined amount, i.e. that the residual is outside the bounded area, for a predetermined time.

A further diagnostic check is carried out using a further algorithm as a checking algorithm, arranged to estimate the rotor position from the same inputs as the main sensorless position determining algorithm. This estimator is therefore arranged to receive as inputs the applied voltages, in this case in the form of α and β axis voltages, and the measured currents, in this case in the form of the α and β axis currents. The estimator produces from the inputs estimates of motor position. The checking algorithm is different from the main position determining algorithm, so that it has different failure modes. It is also simpler than the main algorithm and therefore less likely to fail. However, it is not as accurate as the main algorithm, and not accurate enough to be used to provide the primary indication of motor position for the motor control.

The checking algorithm is arranged to measure the back emf in the motor, and from that to estimate the rotor position. It is defined by the equations:

$$e_{\alpha\beta}(t) = u_{\alpha\beta}(t) - i_{\alpha\beta}(t)R - L di_{\alpha\beta}(t)/dt$$

$$\theta_{EMF}(t) = \tan^{-1}(e_\beta(t)/e_\alpha(t))$$

Where:
$e_{\alpha\beta}(t)$ is the back emf (in alpha beta coordinates)
$u_{\alpha\beta}(t)$ is the input voltage (in alpha beta coordinates)
$i_{\alpha\beta}(t)$ is the measured current (in alpha beta coordinates)
R is the motor resistance
L is the motor inductance
$\theta_{EMF}(t)$ is the position of the back EMF (the electrical motor position $\theta(t)$ lags $\theta_{EMF}(t)$ by 90°)

Figure 12:
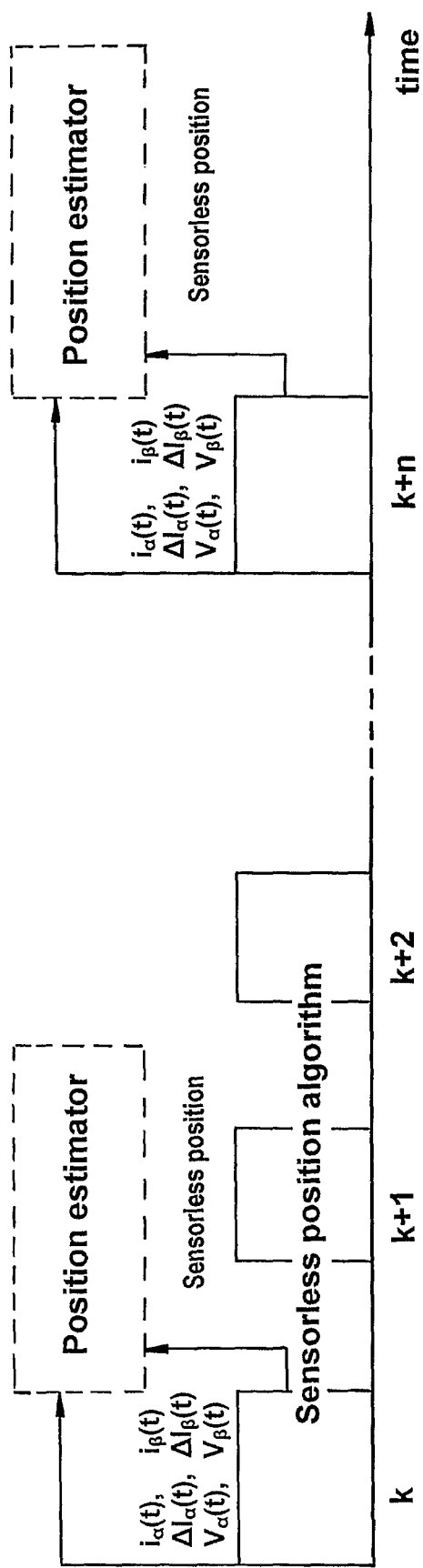
FIG. 12 is a timing diagram showing operation of the sensorless algorithm of FIG. 8.

Referring to FIG. 12, the controller 42 is arranged to sample the applied α and β axis voltages, $V_\alpha(t)$ and $V_\beta(t)$ and the measured α and β axis currents, $i_\alpha(t)$ and $i_\beta(t)$ at regular intervals. At each sampling step, the position determining algorithm is run and outputs a position signal indicative of the rotor position. The change in measured current from the previous step to the current step, $\Delta i_\alpha(t) \Delta i_\beta(t)$, is also determined. The applied voltages, $V_\alpha(t)$ and $V_\beta(t)$, the measured motor currents $i_\alpha(t)$ and $i_\beta(t)$ and the change in motor currents $\alpha i_\alpha(t) \Delta i_\beta(t)$, are then input to the checking algorithm which generates from them a separate estimation of rotor position. The position estimator then compares the position signals generated by the two algorithms. If the difference between the two is greater than a predetermined limit, then a fault indication is generated. Alternatively the fault indication may only be generated if the difference between the two position measurements stays outside a bounded region for at least a predetermined time.

As can be seen from FIG. 12, the position estimator determines the rotor position less frequently than the position determining algorithm. In order to compare the two position measurements properly, the values of the applied α and β axis voltages, $V_\alpha(t)$ and $V_\beta(t)$ and the measured α and β axis currents, $i_\alpha(t)$ and $i_\beta(t)$, and the changes in motor currents $\Delta i_\alpha(t) \Delta i_\beta(t)$ are all time stamped, as is the position signal output from the position determining algorithm. The estimator can therefore compare the two position estimations based on measurements made at the same time. Because of the lower frequency of the estimator, it does not significantly increase the computational overhead of the diagnostic function.

If any of the diagnostic functions results in the generation of a fault indication, then the controller 42 is arranged to stop the motor, reset the position determining algorithm, and restart the motor. The resetting can in some cases clear the fault, and this may therefore enable the motor control to proceed as normal. If, on restarting the motor, a further fault indication is generated within a predetermined time, then it is assumed that resetting will not clear the fault, and further remedial action needs to be taken. The sensorless position determining algorithm is therefore abandoned, and the position estimation of the estimator used in the motor control in its place. In order for the motor control to operate as effectively as possible, the frequency at which the estimator determines the motor position is increased from its normal level. In this case it is increased to be equal to the frequency of the main sensorless algorithm, although smaller increases in frequency may be sufficient in some cases.

It will be appreciated that the checking algorithm can take a number of different forms. For example it could comprise a predictor/compensator type algorithm, rather than the open loop estimator described above. Also in a further embodiment three separate position determining algorithms are used, and the results from all three compared. If one of the three produces different results from the other two, then this gives a clearer indication that it is that one of the three that has a fault and the other two that are operating correctly.

When the motor is stopped, this can be done simply by stopping the applying of voltages to the phases, thereby reducing the driving torque to zero, and allowing the motor to come to rest. However, in this embodiment the motor control is arranged to apply voltages to the motor windings in such a way that they generate a braking torque arranged to being the motor rapidly to a stop.

While this embodiment uses a non-linear observer, other closed loop observers such as a Luenberger observer or a Kalman filter can be used.

The diagnostic methods of this invention can be used in other applications. As well as electro-hydraulic power steering systems, they can also be used in electric power steering systems in which the electric motor provides the power assistance directly to the steering rack. These systems require the motor to produce high torques at an accurately controlled level over a range of motor speeds down to very low speeds. It is therefore very important in such systems to ensure that the motor control is functioning correctly.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A control system for an electric motor comprising: a control unit adapted to be connected to an electric motor and being arranged to determine a position of the motor from at least one electrical parameter by means of a position determining algorithm, the position determining algorithm defining a model of the motor which defines a plurality of states of the model including the motor position, the position determining algorithm including an observer arranged to monitor an output of the model and compare it to a measured parameter thereby to determine a correction factor that can be input to the model, the control unit being further arranged to monitor at least one algorithm parameter defined by the algorithm and to generate a fault indication upon the monitored algorithm parameter meeting a predetermined fault condition.

2. A system according to claim 1 wherein the observer is a non-linear observer.

3. A system according to claim 1 wherein the algorithm parameter corresponds to a measured parameter and the control unit is arranged to compare the algorithm parameter with measured values of the measured parameter to determine whether the fault condition is met.

4. A system according to claim 3 wherein the measured parameter is electrical current.

5. A system according to claim 1 wherein the control unit is arranged to monitor a further algorithm parameter and to determine from the relationship between the two algorithm parameters whether the fault condition is met.

6. A system according to claim 5 wherein the two algorithm parameters are a motor position parameter defining the motor position and a motor velocity parameter defining a motor velocity.

7. A system according to claim 1 wherein the control unit is arranged, in response to the fault indication, to stop the motor and re-start it.

8. A system according claim 1 wherein the control unit is arranged to receive inputs indicative of a vehicle parameter relating to operation of a vehicle, to determine a desired motor speed dependent on the vehicle parameter, and to control the speed of the motor to the desired motor speed.

9. A system according to claim 8 wherein the vehicle parameter is vehicle speed or steering rate.

10. A system according to claim 9 wherein the system includes a motor and is included in a power steering system.

11. A control system for an electric motor comprising:
a control unit adapted to be connected to an electric motor and being arranged to determine a position of the motor from at least one electrical parameter by means of a position determining algorithm, the control unit also arranged to monitor a motor position parameter defining the motor position and a motor velocity parameter defining a motor velocity, the control unit further arranged to compare the motor velocity parameter with a differential of the motor position parameter to determine whether a fault condition is met and, upon the fault condition being met, to generate a fault indication.

12. A control for an electric motor comprising:
a control unit adapted to be connected to an electric motor and being arranged to determine a position of the motor from at least one electrical parameter by means of a position determining algorithm, the control unit also arranged to monitor at least one algorithm parameter defined by the algorithm, the control unit being further arranged to run a checking algorithm that defines a checking parameter, the control unit being operable to compare the position determining parameter to a predetermined fault condition and to compare the checking parameter with a checked parameter of the position determining algorithm to determine whether the fault condition is actually met, and upon the fault condition being met, to generate a fault indication.

13. A system according to claim 12 wherein the checking parameter defines motor position.

14. A system according to claim 12 wherein the checking algorithm is arranged to generate values of the checking parameter less frequently than the position determining algorithm generates values for the checked parameter.

15. A system according to claim 14 wherein the values of at least one of the checking parameter and the checked parameter are time stamped and the control unit is arranged to compare values of the checking and checked parameters generated at substantially the same time.

16. A system according to claim 12 wherein the checking parameter is determined by measuring a back emf in the motor.

17. A system according to claim 16 arranged to measure a rate of change of current in order to measure the back emf.

18. A system according to claim 17 arranged to identify the times at which the rate of change of current is measured, thereby to associate a time with the value of the checking parameter derived from the measured rate of change of current.

19. A system according to claim 18 wherein the control unit is arranged, upon identification of a fault in the position determining algorithm, to use a motor position determined by the checking algorithm in place of that determined by the position determining algorithm to control the motor.

20. A system according to claim 19 wherein the control unit is further arranged, upon identification of a fault in the position determining algorithm, to increase the frequency at which the checking algorithm measures the motor position.

21. A control system for an electric motor comprising:
a control unit adapted to be connected to an electric motor and being arranged to determine a position of the motor from at least one electrical parameter by means of a position determining algorithm, the control unit being further arranged to monitor at least one algorithm parameter defined by the algorithm and to generate a fault indication upon the monitored algorithm parameter meeting a predetermined fault condition; and
a DC link to which a DC link voltage is applied, and a drive stage controller arranged to connect the DC link to windings of the motor to control the motor, the drive stage controller being arranged to determine an electrical parameter of the windings from an electrical parameter of the DC link.

22. A system according to claim 21 wherein the electrical parameter is voltage.

23. A system according to claim 21 wherein the drive stage controller is arranged to connect the windings to the DC link using pulse width modulation control, and to determine the phase voltages from the DC link voltage and duty cycles of the PWM control.

24. A system according to claim 21 wherein the parameter is electric current.

25. A system according to claim 24 wherein the drive stage controller is arranged to open and close connections between each of the windings and the DC link, and to measure the current in one of the windings by measuring the current in the DC link at the times when that winding is connected to the DC link.

* * * * *